(12) United States Patent
Kobayashi et al.

(10) Patent No.: US 9,646,778 B2
(45) Date of Patent: May 9, 2017

(54) GAS INSULATED SWITCHING APPARATUS AND SWITCH

(71) Applicant: MITSUBISHI ELECTRIC CORPORATION, Chiyoda-ku (JP)

(72) Inventors: Shogo Kobayashi, Chiyoda-ku (JP); Yosuke Kuruma, Chiyoda-ku (JP); Tsuyoshi Mori, Chiyoda-ku (JP); Osamu Kisanuki, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/031,857

(22) PCT Filed: Jan. 21, 2014

(86) PCT No.: PCT/JP2014/051093
§ 371 (c)(1),
(2) Date: Apr. 25, 2016

(87) PCT Pub. No.: WO2015/111133
PCT Pub. Date: Jul. 30, 2015

(65) Prior Publication Data
US 2016/0268069 A1 Sep. 15, 2016

(51) Int. Cl.
*H01H 3/00* (2006.01)
*H01H 3/26* (2006.01)
(Continued)

(52) U.S. Cl.
CPC ............... *H01H 3/26* (2013.01); *H01H 3/36* (2013.01); *H01H 3/44* (2013.01); *H01H 33/42* (2013.01); *H01H 33/36* (2013.01); *H02B 13/035* (2013.01)

(58) Field of Classification Search
CPC .................................................... H01H 33/666
(Continued)

(56) References Cited

U.S. PATENT DOCUMENTS 3,819,892 A * 6/1974 Rathbun .............. H01H 33/668
218/118
4,655,098 A 4/1987 Marquardt et al.
(Continued)

FOREIGN PATENT DOCUMENTS

EP    1 361 633 B1    11/2003
EP    2 346 055 A1    7/2011
(Continued)

OTHER PUBLICATIONS

International Search Report (PCT/ISA/210) issued on Apr. 8, 2014, by the Japanese Patent Office as the International Searching Authority for International Application No. PCT/JP2014/051093.
(Continued)

*Primary Examiner* — Alexander Talpalatski
(74) *Attorney, Agent, or Firm* — Buchanan Ingersoll & Rooney PC

(57) ABSTRACT

An operating device for a disconnector includes a drive unit, a Geneva mechanism, and a wire. The drive unit includes a forwardly and reversely rotatable motor serving as a drive source for driving a movable contactor of the disconnector, a power source supplying power to the motor, and a first pulley connected to a rotary shaft of the motor, and is disposed apart from the disconnector. The Geneva mechanism includes a second pulley that rotates in the same direction as the first pulley with the rotation of the first pulley, and a driven wheel that is intermittently driven while the second pulley rotates and that is provided with a rotary shaft connected to the movable contactor, and is attached to the disconnector apart from the drive unit. Further, as a
(Continued)

flexible rotational force transmission member, a wire is stretched between the second pulley and the first pulley.

5 Claims, 7 Drawing Sheets

(51) Int. Cl.
    *H01H 33/42*     (2006.01)
    *H01H 3/44*     (2006.01)
    *H01H 3/36*     (2006.01)
    *H01H 33/36*     (2006.01)
    *H02B 13/035*     (2006.01)

(58) Field of Classification Search
    USPC ............................................................ 218/154
    See application file for complete search history.

(56) References Cited

U.S. PATENT DOCUMENTS

| | | | |
|---|---|---|---|
| 6,049,050 A * | 4/2000 | David | H01H 3/36 218/154 |
| 6,727,454 B2 | 4/2004 | Okabe et al. | |
| 7,880,104 B2 | 2/2011 | Grieshaber et al. | |
| 8,035,329 B2 | 10/2011 | Koerber | |
| 2014/0360853 A1 * | 12/2014 | Sato | H01H 33/666 200/5 R |

FOREIGN PATENT DOCUMENTS

| | | |
|---|---|---|
| JP | 01-003146 Y2 | 1/1989 |
| JP | 1-186106 A | 7/1989 |
| JP | 03-019654 B2 | 3/1991 |
| JP | 3-45009 U | 4/1991 |
| JP | 03-060729 U | 6/1991 |
| JP | 3-133018 A | 6/1991 |
| JP | 07-043909 Y2 | 10/1995 |
| JP | 11-025813 A | 1/1999 |
| JP | 2881848 B2 | 4/1999 |
| JP | 11-353984 A | 12/1999 |
| JP | 11-355926 A | 12/1999 |
| JP | 2000-285772 A | 10/2000 |
| JP | 2002-152922 A | 5/2002 |
| JP | 2002-152925 A | 5/2002 |
| JP | 2002-315120 A | 10/2002 |
| JP | 2003-230208 A | 8/2003 |
| JP | 2006-296062 A | 10/2006 |
| JP | 2007-515744 A | 6/2007 |
| JP | 4059081 B2 | 3/2008 |
| JP | 2011-146199 A | 7/2011 |
| JP | 5021288 B2 | 9/2012 |

OTHER PUBLICATIONS

Written Opinion (PCT/ISA/237) issued on Apr. 8, 2014, by the Japanese Patent Office as the International Searching Authority for International Application No. PCT/JP2014/051093.
Notice of Rejection mailed on Aug. 26, 2014, by the Japanese Patent Office for Application No. 2014-530991.

* cited by examiner (a)            (b)

(a)        (b)        (c)

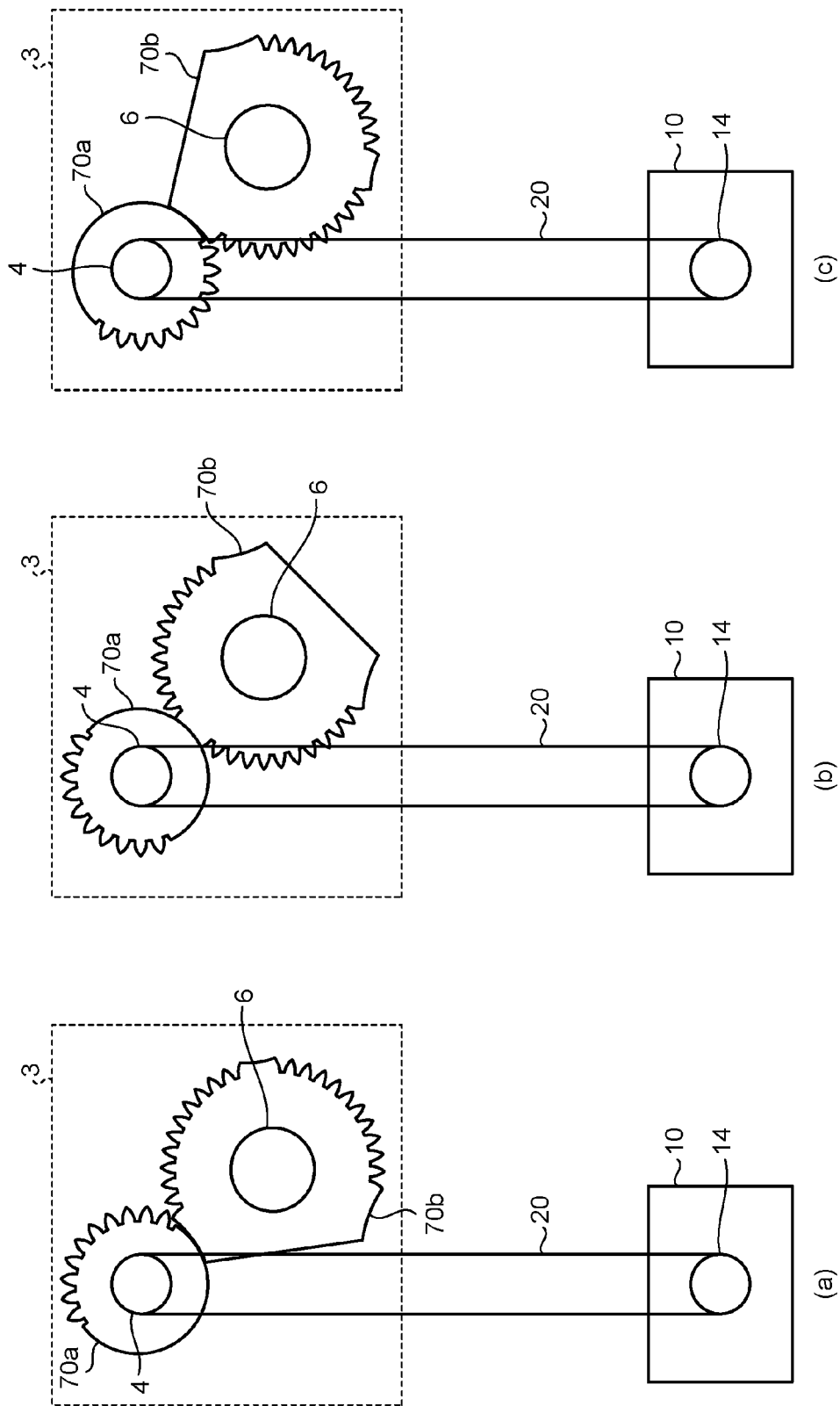

GAS INSULATED SWITCHING APPARATUS AND SWITCH

FIELD

The present invention relates to a gas insulated switching apparatus and a switch.

BACKGROUND

Gas insulated switching apparatuses used in power stations, substations or the like are constituted by combining various devices such as breakers, disconnectors, grounding switches, and bus-bars. Because the gas insulated switching apparatus is constituted by combining a plurality of devices in a limited space, downsizing of each device and reduction of the installation area of the overall apparatus have become an issue.

Incidentally, a switch such as a disconnector constituting a gas insulated switching apparatus is opened and closed by an operating device provided separately from the switch main body. Thus, in the gas insulated switching apparatus, downsizing of the operating device for the switch and reduction of the installation area of the overall apparatus including the operating device are desired.

Patent Literature 1 discloses an operating device for a switch which functions both as a disconnector and a grounding switch. The operating device for the switch is mounted on the switch main body. In addition, the operating device for the switch is configured to be provided with a drive unit such as a power source and a motor in an integrated fashion.

CITATION LIST

Patent Literature

Patent Literature 1: Japanese Patent Application Laid-Open No. H11-353984

SUMMARY

Technical Problem

However, because the conventional operating device for the switch is provided such that it is integral with the drive unit such as a power source and a motor, the size of the operating device increases, and thus the installation area of the gas insulated switching apparatus also increases.

Further, because the conventional operating device for the switch is mounted on the switch main body, in order to secure a work space for the increased size of the operating device and for inspecting the power source output, the gap between the line units increases, and thus the installation area of the gas insulated switching apparatus also increases.

Meanwhile, there is also a configuration in which the operating device for the switch is installed at a position apart from the switch main body. With this configuration, the operating device and the switch main body are connected to each other by a connecting rod, and the switch is operated by the operating device via the connecting rod.

However, with the configuration that connects the operating device and the switch main body by the connecting rod, because it is necessary to secure a space for disposing the connecting rod, the installation area of the gas insulated switching apparatus increases. In addition, with this configuration, because the position at which the connecting rod can be disposed is limited, the installation position of the operating device is also limited.

The present invention has been made in view of the above, and an object of the present invention is to provide a gas insulated switching apparatus and a switch capable of realizing downsizing of the mounting portion of an operating device for a switch serving as a disconnector, a grounding switch, or a disconnector with a grounding switch to the switch, improvement of arrangement flexibility of the operating device, and reduction of the installation area of the overall apparatus.

Solution to Problem

In order to solve the above problems and achieve the object, a gas insulated switching apparatus according to an aspect of the present invention is a gas insulated switching apparatus that includes a switch that is a disconnector, a grounding switch, or a disconnector including a grounding switch in an integrated fashion, and an operating device for the switch, wherein the operating device comprises: a drive unit that includes a forwardly and reversely rotatable motor serving as a drive source for driving a movable contactor of the switch, a power source that supplies electric power to the motor, and a first pulley that rotates with rotation of the motor; a Geneva mechanism that includes a second pulley that rotates with rotation of the first pulley, and a driven wheel that is intermittently driven while the second pulley rotates to drive the movable contactor, the Geneva mechanism being attached to the switch disconnected from the drive unit; and a flexible rotational force transmission member that is stretched between the first pulley and the second pulley to transmit a rotational force of the motor from the first pulley to the second pulley.

Advantageous Effects of Invention

According to the present invention, effects are obtained whereby it is possible to realize downsizing of the mounting portion of an operating device for a switch serving as a disconnector, a grounding switch, or a disconnector with a grounding switch to the switch, improvement of arrangement flexibility of the operating device, and reduction of the installation area of the overall apparatus.

BRIEF DESCRIPTION OF DRAWINGS

FIG. 11 is a diagram for explaining the operation of the operating device for the switch according to the second embodiment.

DESCRIPTION OF EMBODIMENTS

Hereinafter, a gas insulated switching apparatus and a switch according to the embodiments of the present invention will be described in detail with reference to the accompanying drawings. The present invention is not limited by the embodiments.

First Embodiment

Figure 1:
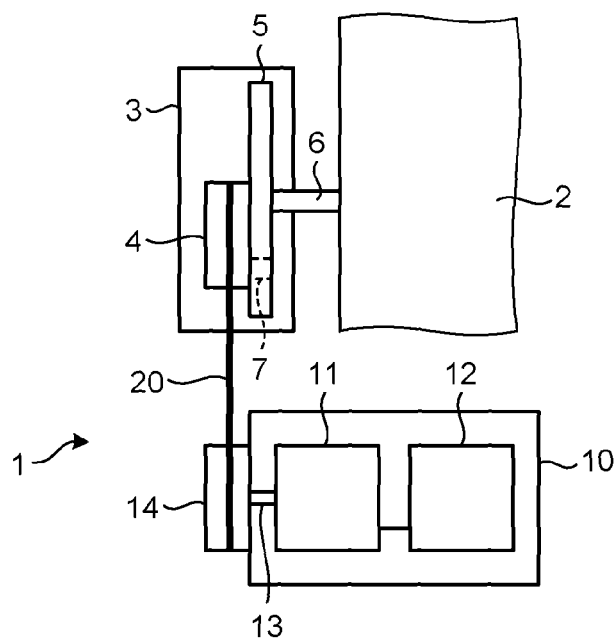
FIG. 1 is a side view illustrating the configuration of an operating device for a switch according to a first embodiment.
Figure 2:
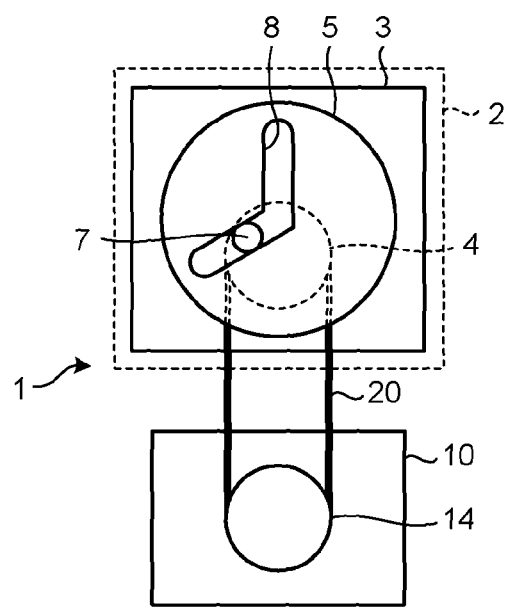
FIG. 2 is a front view illustrating the configuration of the operating device for the switch according to the first embodiment.

FIG. 1 is a side view illustrating a configuration of an operating device for a switch according to the present embodiment. FIG. 2 is a front view illustrating the configuration of the operating device for the switch according to the present embodiment.

In FIGS. 1 and 2, there is a description, as an example of the switch, of a disconnector 2 constituting a gas insulated switching apparatus. Accordingly, an operating device 1 is a device for operating the disconnector 2. Also, the disconnector 2 is, for example, a disconnector with a grounding switch. That is, the disconnector 2 is a disconnector that includes a grounding switch in an integrated fashion, and functions both as the disconnector and the grounding switch. Further, a disconnector (having no grounding switch) or a grounding switch may be used as the switch. In addition, in FIGS. 1 and 2, the overall configuration and the internal configuration of the disconnector 2 are not illustrated. Further, the operating device 1 may be a constituent element of the disconnector 2.

As illustrated in FIGS. 1 and 2, the operating device 1 includes a Geneva mechanism 3 attached to the disconnector 2, a drive unit 10 disconnected from the Geneva mechanism 3, and a wire 20 for transmitting a driving force generated by the drive unit 10 to the Geneva mechanism 3. The Geneva mechanism 3 is disposed adjacent to the disconnector 2 side, and, for example, is directly connected to the disconnector 2.

The drive unit 10 includes a motor 11, a power source 12 connected to the motor 11 to supply an electric power to the motor 11, and a pulley 14 (a first pulley) that is, for example, connected to a rotary shaft 13 (shaft) of the motor 11 and rotates with the rotation of the motor 11. The rotary shaft 13 of the motor 11 is rotatable forwardly and reversely, and the motor 11 is a drive source for driving a movable contactor (not illustrated) of the disconnector 2. The pulley 14 rotates in the same direction as the rotary shaft 13 with the rotation of the rotary shaft 13 of the motor 11. The drive unit 10 is disposed apart from the disconnector 2.

The Geneva mechanism 3 is attached to the tank of the disconnector 2 on the outside of the disconnector 2 and is, for example, directly connected to the disconnector 2. In contrast, the drive unit 10 is disconnected from the Geneva mechanism 3 and is installed at a position apart from the disconnector 2. In addition, although the disconnector 2 is formed by filling the tank with an insulating gas, the Geneva mechanism 3 is provided outside the disconnector 2 and the interior of its housing is also exposed to the atmosphere.

The Geneva mechanism 3 includes a pulley 4 (a second pulley) that rotates in the same direction as the pulley 14 with the rotation of the pulley 14, a driven wheel 5 that intermittently rotates while the pulley 4 rotates, and a rotary shaft 6 provided on the driven wheel 5.

The pulley 4 is pivotally supported in the housing of the Geneva mechanism 3. A metallic wire 20 that is a flexible rotational force transmission member is stretched between the pulley 4 and the pulley 14. The rotational force of the motor 11 is transmitted to the pulley 4 from the pulley 14 via the wire 20, and the pulley 4 is driven in the same direction as the pulley 14 with the rotation of the pulley 14.

The pulley 4 includes a pin 7 (a projection) on one end surface in the axial direction. The pin 7 is provided on the outer diameter side of the pulley 4. Further, the driven wheel 5 is pivotally supported in the housing of the Geneva mechanism 3. The driven wheel 5 is disposed such that the side surface on the opposite side of the side surface on which the rotary shaft 6 is provided faces the side surface on which the pin 7 of the pulley 4 is provided. The radius of the driven wheel 5 is larger than the radius of the pulley 4. The driven wheel 5 is provided with a groove 8 with which the pin 7 is engaged. The groove 8 has, for example, a V-shape, and has two portions that extend in the radial direction and are connected at the center of the driven wheel 5. The pin 7 is guided in the groove 8 with the rotation of the pulley 4 and then moves in the groove 8. The driven wheel 5 is stopped without being driven by the pulley 4 when the pin 7 is located near the base end portion (a portion corresponding to the V-shaped base end portion and located at the center of the driven wheel 5) of the groove 8, and the driven wheel 5 is driven by the pulley 4 when the pin 7 is located at other positions of the groove 8. The driven wheel 5 intermittently operates so as to operate the movable contactor of the disconnector 2 within a preset driving range. In other words, a positional relation between the pin 7 and the groove 8 is set to achieve such an operation of the driven wheel 5. The rotary shaft 6 is a shaft that drives the movable contactor of the disconnector 2, and is directly or indirectly connected to the movable contactor. The driven wheel 5 drives the movable contactor of the disconnector 2 via the rotary shaft 6.

As described above, although the Geneva mechanism 3 has a simple structure, it may be achieved by other structures other than the illustrated example.

Figure 3:
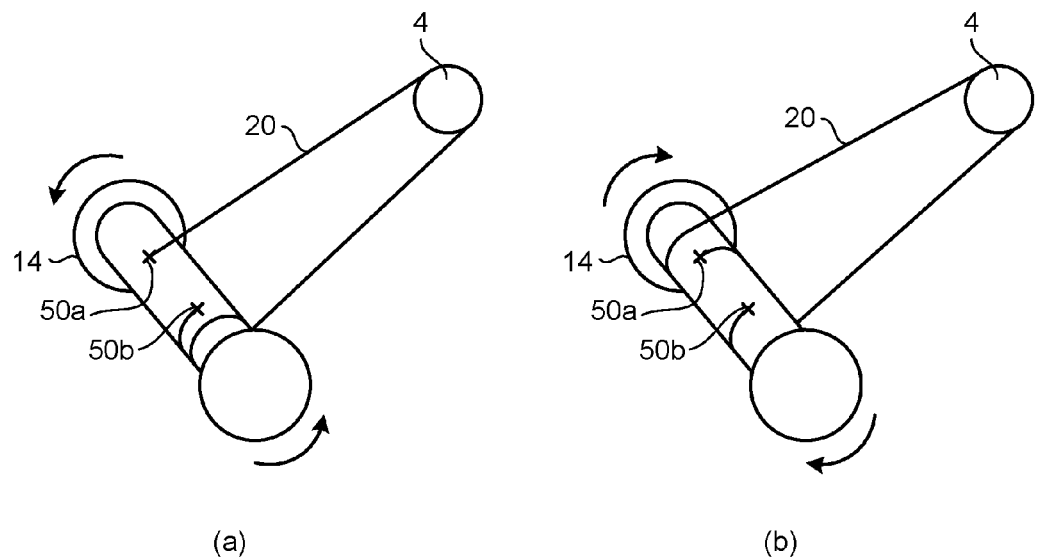
FIG. 3 is a schematic diagram illustrating an example of a stretching method of a wire.

FIG. 3 is a schematic diagram illustrating an example of the stretching method of the wire 20. In FIG. 3, the outer circumferential surface and the like of the pulley 4 are not illustrated.

The wire 20 has one end fixed at a fixing point 50a on the outer circumferential surface of the pulley 14, and the other end fixed at a fixing point 50b on the outer circumferential surface of the pulley 14. The fixing point 50a is axially spaced apart from the fixing point 50b.

In FIG. 3(a), the wire 20 is drawn from the fixing point 50a to the pulley 4, is stretched to the pulley 4, and is further drawn to the pulley 14, and then the wire 20 is wound on the outer circumferential surface of the pulley 14 a predetermined number of times and fixed to the fixing point 50b. The wire 20 is stretched over the pulleys 4 and 14 so as not to become loose.

In FIG. 3(a), when the pulley 14 rotates in a direction of the arrows (counterclockwise), the wire 20 is wound around the outer circumferential surface on the fixing point 50a side and is unwound on the fixing point 50b side. Due to this, the pulley 4 also rotates counterclockwise, and the pulley 14 shifts to the state of FIG. 3(b).

Further, in FIG. 3(b), when the pulley 14 rotates in a direction of the arrows (clockwise), the wire 20 is wound around the outer circumferential surface on the fixing point 50b side and is unwound on the fixing point 50a side. Due to this, the pulley 4 also rotates clockwise, and the pulley 14 shifts to the state of FIG. 3(a).

Further, the stretching method of the wire 20 to the pulleys 4 and 14 is not limited to the illustrated example, and other stretching methods may also be adopted.

Figure 4:
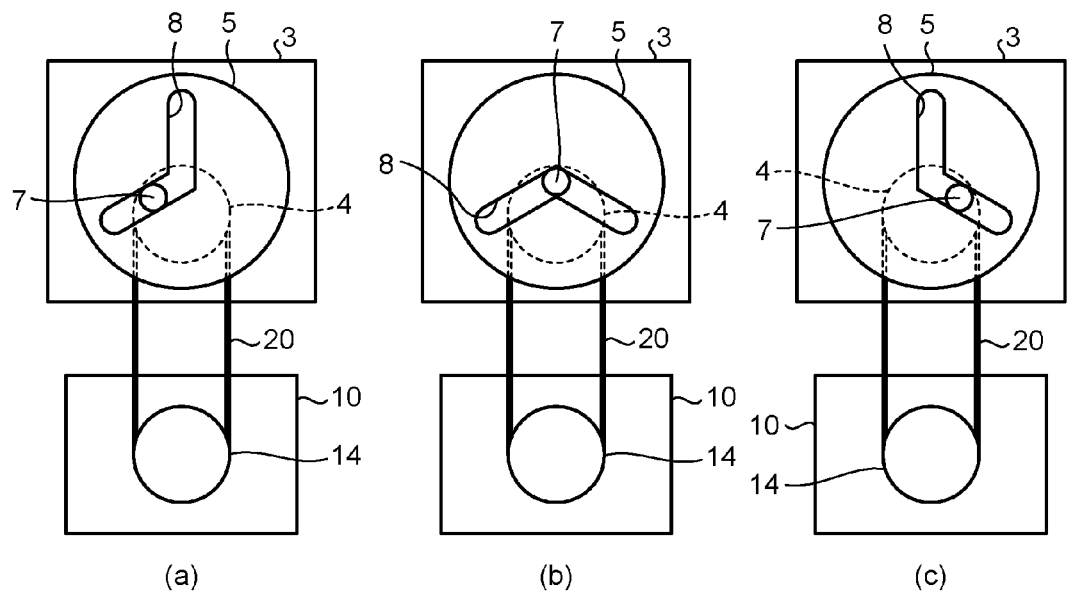
FIG. 4 is a diagram for explaining the operation of the operating device.
Figure 5:
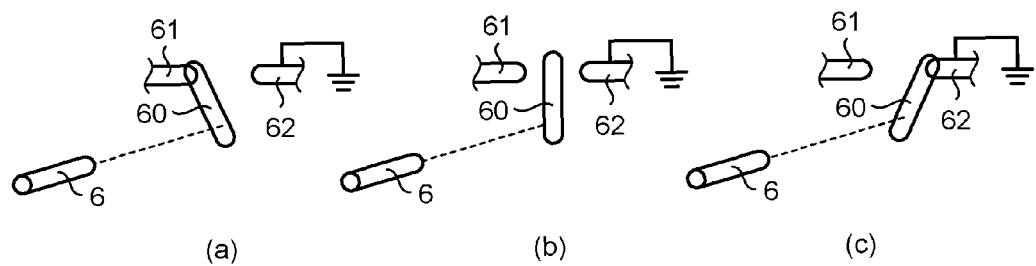
FIG. 5 is a diagram for explaining the operation of the switch.

Next, the operation of the operating device 1 will be described with reference to FIGS. 4 and 5. FIG. 4 is a diagram for explaining the operation of the operating device 1. In particular, FIG. 4(a) is a diagram of the operating device when the disconnector is in an ON state; FIG. 4(b) is a diagram of the operating device when the disconnector is in a fully open state; and FIG. 4(c) is a diagram of the operating device when the disconnector is in a grounded state. FIG. 5 is a diagram for explaining the operation of the disconnector 2. In particular, FIG. 5(a) is a diagram of when the disconnector is in an ON state; FIG. 5(b) is a diagram of when the disconnector is in a fully open state; and FIG. 5(c) is a diagram of when the disconnector is in a grounded state.

First, the outline of the configuration of the disconnector 2 will be described (FIG. 5). The disconnector 2, for example, includes a blade-shaped movable contactor 60. The movable contactor 60 is directly or indirectly connected to the rotary shaft 6 to rotate in the same direction as the rotary shaft 6 with the rotation of the rotary shaft 6. The movable contactor 60 is commonly used in the disconnector and the grounding switch. Further, a fixed contactor 61 is a fixed contactor of the disconnector 2, and a fixed contactor 62 is a fixed contactor of the grounding switch. The configuration of the disconnector 2 is not limited to the illustrated example, and it is also possible to use a configuration in which the movable contactor is a linear movement type. In this case, a gear mechanism or the like for converting the rotation of the rotary shaft 6 into a linear movement is interposed between the rotary shaft 6 and the movable contactor.

Next, for example, the operation in the case of switching the disconnector 2 from the fully open state (FIG. 5(b)) to the disconnector ON state (FIG. 5(a)) will be described. In the state of FIG. 4(b), when the motor 11 starts to rotate clockwise and the pulley 14 rotates clockwise, the pulley 4 also rotates clockwise via the wire 20 and the pin 7 moves inside the groove 8 to the outer diameter side. The pulley 4 idles until the pin 7 moves inside the groove 8 in the radial direction from the V-shaped base end portion of the groove 8 by a predetermined distance, thereafter, the pin 7 is engaged with the groove 8, and the rotation of the pulley 4 is transmitted to the driven wheel 5. That is, the pin 7 rotates the driven wheel 5 clockwise, while moving inside the groove 8 to the outer diameter side, and the pin 7 rotates the driven wheel 5 in the same direction, while converting the movement direction inside the groove 8 to move to the inner diameter side, and reaches the state of FIG. 4(a). In the state of FIG. 4(a), because the pulley 4 idles again, the driven wheel 5 stops and the movable contactor 60 stops in a state of being in contact with the fixed contactor 61 (FIG. 5(a)). The motor 11 is controlled so as to be stopped during the idling of the pulley 4 after the state of FIG. 4(a).

Next, for example, the operation in the case of switching the disconnector 2 from the fully open state (FIG. 5(b)) to the grounded state (FIG. 5(c)) will be described. In the state of FIG. 4(b), when the motor 11 starts to rotate counterclockwise and the pulley 14 rotates counterclockwise, the pulley 4 also rotates counterclockwise via the wire 20 and the pin 7 moves inside the groove 8 to the outer diameter side. The pulley 4 idles until the pin 7 moves inside the groove 8 in the radial direction from the V-shaped base end portion of the groove 8 by a predetermined distance, thereafter, the pin 7 is engaged with the groove 8, and the rotation of the pulley 4 is transmitted to the driven wheel 5. That is, the pin 7 rotates the driven wheel 5 counterclockwise, while moving inside the groove 8 to the outer diameter side, and the pin 7 rotates the driven wheel 5 in the same direction, while converting the movement direction inside the groove 8 to move to the inner diameter side, and reaches the state of FIG. 4(c). In the state of FIG. 4(c), because the pulley 4 idles again, the driven wheel 5 stops and the movable contactor 60 stops in a state of being in contact with the fixed contactor 62 (FIG. 5(c)). The motor 11 is controlled so as to be stopped during the idling of the pulley 4 after the state of FIG. 4(c).

Other operations of the disconnector 2 can be similarly described. By controlling the driving of the movable contactor 60 by the use of the Geneva mechanism 3, it is possible to mechanically fix the contact position between the movable contactor 60 and the fixed contactors 61 and 62, and the fully open position, and the reliability of the operation of the disconnector 2 becomes higher than the case where the switching is electrically controlled.

Figure 6:
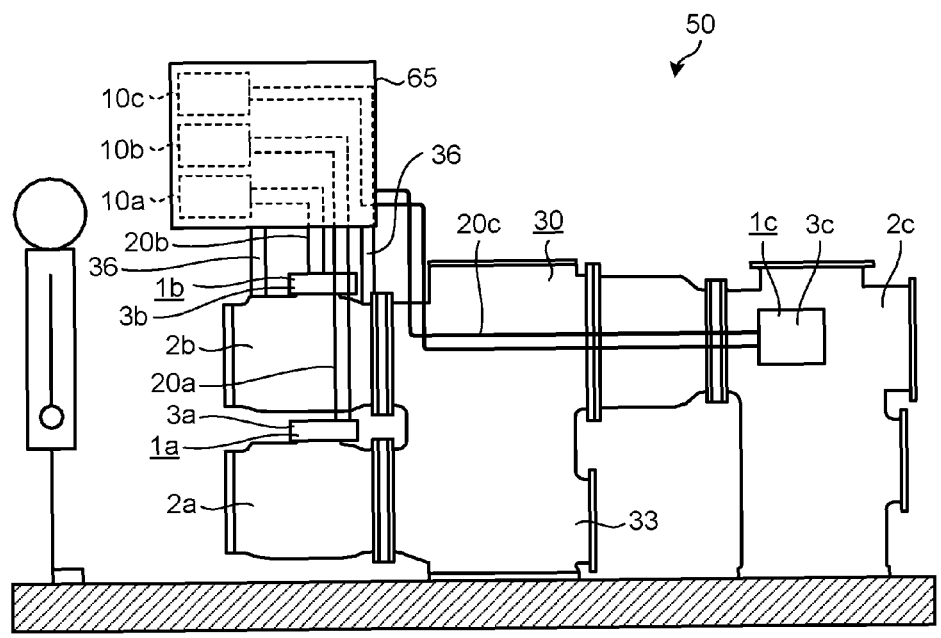
FIG. 6 is a side view illustrating the arrangement configuration of a gas insulated switching apparatus according to the first embodiment.

Next, an example of the arrangement configuration of the gas insulated switching apparatus according to the present embodiment will be described. FIG. 6 is a side view illustrating the arrangement configuration of the gas insulated switching apparatus according to the present embodiment, and FIG. 7 is a front view illustrating the arrangement configuration of the gas insulated switching apparatus according to the present embodiment.

Figure 7:
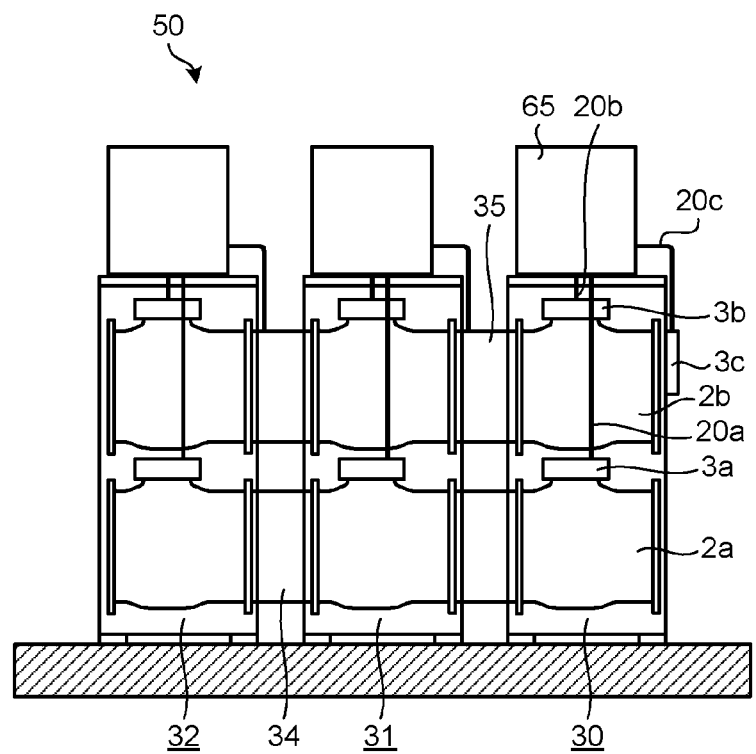
FIG. 7 is a front view illustrating the arrangement configuration of the gas insulated switching apparatus according to the first embodiment.

As illustrated in FIGS. 6 and 7, a gas insulated switching apparatus 50 is configured such that line units 30 to 32 are connected to each other by bus-bars 34 and 35. The line units 30 to 32 include a breaker, a disconnector, and the like, and are separately configured depending on their purposes (for example, a power transmission and reception line unit, and a voltage transformer line unit). The gas insulated switching apparatus 50 is, for example, a three-phase collective type (a three-phase device is housed in the same tank). Hereinafter, only the configuration of the line unit 30 will be described in detail, and with regard to the line units 31 and 32, only the configuration related to the operating device will be briefly described.

The configuration of the line unit 30 will be described. The line unit 30 includes a breaker 33 disposed such that its axis is perpendicular to the installation surface; a disconnector 2a with a grounding switch of a bus-bar side connected to the breaker 33; a disconnector 2b with a grounding switch of the bus-bar side connected to the breaker 33 and disposed above the disconnector 2a; and a disconnector 2c with a grounding switch of the line side connected to the breaker 33. The disconnector 2a is connected to the bus-bar 34 and the disconnector 2b is connected to the bus-bar 35.

A Geneva mechanism 3a of an operating device 1a for the disconnector 2a is provided above the disconnector 2a. A drive unit 10a of the operating device 1a is housed in a box 65 that is disposed over the disconnector 2b with a frame 36 therebetween. A wire 20a is stretched between a first pulley (not illustrated) of the drive unit 10a and a second pulley (not illustrated) of the Geneva mechanism 3a. The configuration of the operating device 1a is the same as that of the operating device 1 described referring to FIGS. 1 to 5.

A Geneva mechanism 3b of an operating device 1b for the disconnector 2b is provided above the disconnector 2b. A drive unit 10b of the operating device 1b is housed, similarly to the drive unit 10a, in the box 65. A wire 20b is stretched between a first pulley (not illustrated) of the drive unit 10b and a second pulley (not illustrated) of the Geneva mechanism 3b. The configuration of the operating device 1b is the same as that of the operating device 1.

A Geneva mechanism 3c of an operating device 1c for the disconnector 2c is provided on the side surface of the disconnector 2c. A drive unit 10c of the operating device 1c is housed, similarly to the drive units 10a and 10b, in the box 65. A wire 20c is stretched between a first pulley (not illustrated) of the drive unit 10c and a second pulley (not illustrated) of the Geneva mechanism 3c. The configuration of the operating device 1c is the same as that of the operating device 1.

The wires 20a to 20c are, for example, housed in a tube (not illustrated) at least on the outside of the box 65 and on the outside of the housing of the Geneva mechanisms 3a to 3c, and are routed by allowing the tube to pass through a hole in a mounting plate (not illustrated). Because each of the bending directions of the wires 20a to 20c has three-dimensional flexibility without being limited to the same plane, it is possible to freely adjust the routing direction such that routing is easy depending on the positional relation between the disconnectors 2a to 2c and the box 65. For example, routing of the wire 20c is not limited to the same plane, and the wire 20c is three-dimensionally routed without being only on the same plane. Also, the movement path (a wiring path) of the wire 20c between the Geneva mechanism 3c and the drive unit 10c is bent.

The configurations of the line units 31 and 32 are the same as that of the line unit 30. Although reference numerals are omitted, each of the line units 31 and 32 includes two disconnectors with a grounding switch of the bus-bar side, a disconnector with a grounding switch of the line-side, and operating devices for the respective disconnectors. The configuration of each operating device is the same as that of the operating device 1.

As described above, in the present embodiment, the operating device 1 is configured such that the Geneva mechanism 3 is attached to the disconnector 2, the drive unit 10 is disconnected from the Geneva mechanism 3 and disposed apart from the disconnector 2, and the wire 20 is stretched between the pulley 14 of the drive unit 10 and the pulley 4 of the Geneva mechanism 3 to transmit the driving force of the motor 11 (FIGS. 1 to 5). Furthermore, the configuration of the operating device 1 is applied to the operating device for the disconnector of the gas insulated switching apparatus 50 (FIGS. 6 and 7).

With such a configuration, as the drive unit 10 is disconnected, the size of the portion of the operating device 1 attached to the disconnector 2 is reduced by the size of the drive unit 10. Therefore, it is possible to reduce the gap between the line units of the gas insulated switching apparatus 50, and the installation area of the gas insulated switching apparatus 50 can be reduced (FIG. 7).

In addition, because the drive unit 10 of the operating device 1 is disconnected from the Geneva mechanism 3, the drive unit 10 can be disposed at the position in which maintenance and inspection are more easily performed. For example, in FIGS. 6 and 7, the drive units 10a to 10c are housed in the box 65 on the front side of the line unit 30.

Therefore, an operator does not need to reach the installation position of the disconnectors 2a to 2c and the like to check the power source output, and thus, the workability is improved (FIG. 7).

Further, by adopting a configuration that transmits a driving force between the drive unit 10 and the Geneva mechanism 3 via the wire 20, the internal structure of the operating device 1 is simplified and the overall size of the operating device 1 is also reduced, which leads to downsizing of the apparatus and a reduction in the installation area of the gas insulated switching apparatus 50.

Further, in the present embodiment, the driving force is transmitted between the drive unit 10 and the Geneva mechanism 3 via the wire 20. Because the wire 20 has three-dimensional flexibility, the degree of freedom of routing increases and the degree of freedom of the installation position of the drive unit 10 also increases. In FIGS. 6 and 7, the drive units 10a to 10c are integrated at one position using the wires 20a to 20c and are housed in the box 65.

Further, in the present embodiment, although the wire 20 is used as the flexible rotational force transmission member stretched between the pulley 4 and the pulley 14, other components, such as a belt-like member, may be used as long as they have three-dimensional bending flexibility and constant intensity.

Also, although a configuration that uses a chain by replacing the pulley with a pair of gears is also conceivable instead of using the wire 20, because it is necessary to rotate the chain in the same plane, the arrangement flexibility of the drive unit 10 would be limited.

Figure 8:
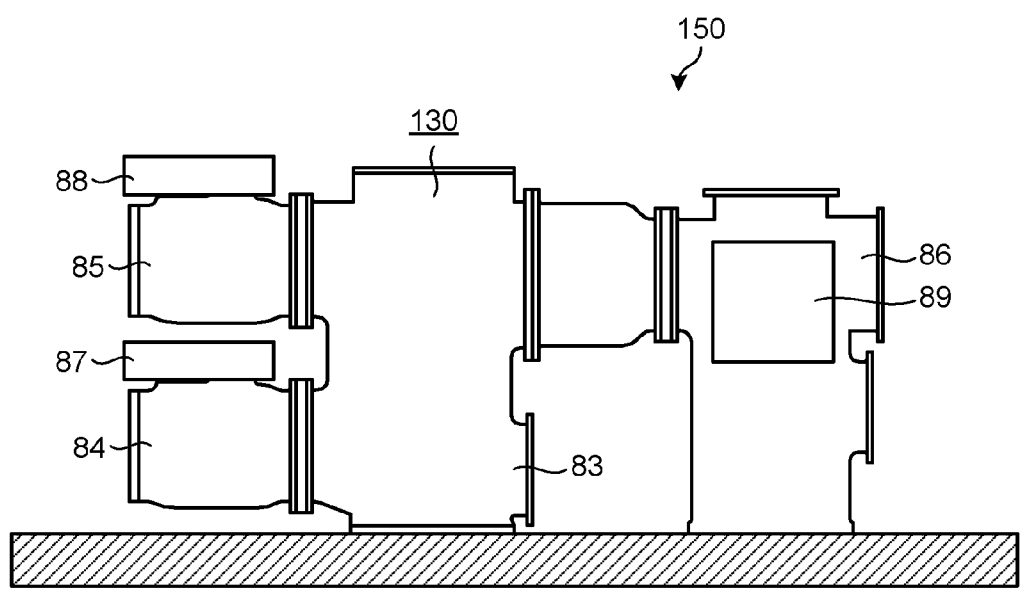
FIG. 8 is a side view illustrating the arrangement configuration of a conventional gas insulated switching apparatus.

Next, for comparison with the present embodiment, an arrangement configuration of a conventional gas insulated switching apparatus will be described. FIG. 8 is a side view illustrating the arrangement configuration of the conventional gas insulated switching apparatus, and FIG. 9 is a front view illustrating the arrangement configuration of the conventional gas insulated switching apparatus.

Figure 9:
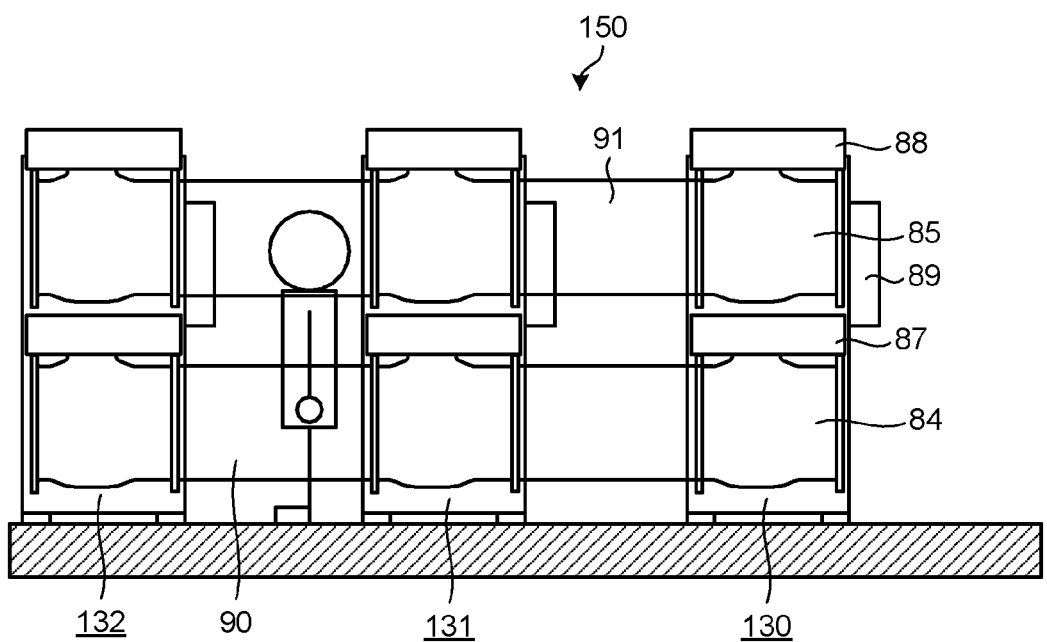
FIG. 9 is a front view illustrating the arrangement configuration of the conventional gas insulated switching apparatus.

As illustrated in FIGS. 8 and 9, a conventional gas insulated switching apparatus 150 is configured such that line units 130 to 132 are connected to each other by bus-bars 90 and 91. Each of the line units 130 to 132 is provided with a breaker, a disconnector, and the like. The line unit 130 is provided with a breaker 83, disconnectors 84 and 85 with a grounding switch of the bus-bar side, and a disconnector 86 with a grounding switch of the line side. Further, an operating device 87 for the disconnector 84 is disposed over the disconnector 84, an operating device 88 for the disconnector 85 is disposed over the disconnector 85, and an operating device 89 for the disconnector 86 is disposed on the side surface of the disconnector 86. Further, the line units 131 and 132 have the same configuration as that of the line unit 130.

In the conventional gas insulated switching apparatus 150, each of the operating devices 87 to 89 is provided with a motor (not illustrated) and a power source (not illustrated) in an integrated fashion. Therefore, the sizes of the operating devices 87 to 89 become larger than that of the Geneva mechanisms 3a to 3c illustrated in FIGS. 6 and 7, which leads to an increase in the installation area of the gas insulated switching apparatus 150.

Furthermore, in the conventional gas insulated switching apparatus 150, because the operating devices 87 to 89 are attached to the disconnectors 84 to 86, respectively, in addition to an increase in the gap between the line units with an increase in the device size, an operator needs to reach the installation positions of the operating devices 87 to 89 for inspection of the power source output, and it is also necessary to ensure that there is a gap between the line units for ensuring the working space (FIG. 9). Therefore, in the conventional gas insulated switching apparatus 150, the gap between the line units increases when compared with the present embodiment, and the installation area of the gas insulated switching apparatus 150 increases. In addition, the workability is also lowered due to the inspection of the power source output.

Although it is not illustrated, in the conventional gas insulated switching apparatus, there is a configuration in which the operating device for the switch is disposed apart from the switch, and the switch and the operating device are connected to each other by a connecting rod.

However, the connecting rod requires an installation space, which leads to an increase in the installation area of the gas insulated switching apparatus, and the arrangement position of the operating device is limited.

According to the present embodiment, as compared with the conventional operating device for the switch, downsizing of the mounting portion of the operating device to the switch, an improvement in the arrangement flexibility of the operating device, and a reduction of the installation area of the overall apparatus are achieved.

Second Embodiment

Figure 10:
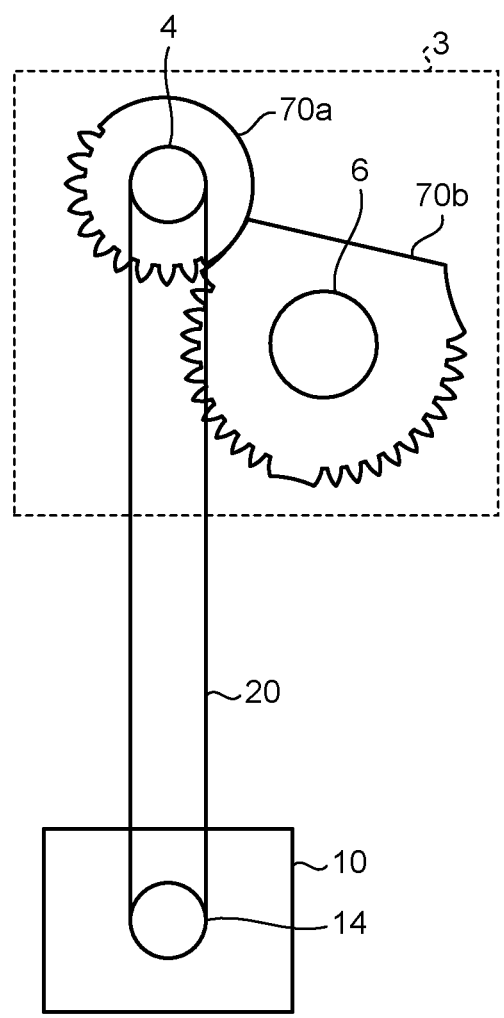
FIG. 10 is a front view illustrating the configuration of an operating device for a switch according to a second embodiment.

In the present embodiment, a configuration example different from the configuration of the Geneva mechanism described in the first embodiment will be described. FIG. 10 is a front view illustrating a configuration of an operating device for a switch according to the present embodiment. In FIG. 10, the same constituent elements as those of FIGS. 1 and 2 are denoted by the same reference numerals. Further, in FIG. 10, the configurations other than the pulley 14 in the drive unit 10 are not illustrated, and a disconnector is also not illustrated.

As illustrated in FIG. 10, in the present embodiment, the Geneva mechanism 3 includes the pulley 4, a partially toothless gear 70a (a first partially toothless gear) driven by the pulley 4, and a partially toothless gear 70b (a second partially toothless gear) that is intermittently driven while the pulley 4 rotates to drive the movable contactor of the disconnector by rotating only when the mutual teeth are engaged with each other with the rotation of the partially toothless gear 70a.

The partially toothless gear 70a, for example, is coaxially fixed to the pulley 4 and is driven with the rotation of the pulley 4. The partially toothless gear 70a, for example, is provided with teeth only over an approximately half circumference.

The partially toothless gear 70b is provided with the rotary shaft 6 that is directly or indirectly connected to the movable contactor of the disconnector. That is, the partially toothless gear 70b corresponds to the driven wheel 5 of the first embodiment.

The partially toothless gear 70b has a shape that is obtained by linearly cutting a part of a circle, each of both circumferential end portions of the outer circumferential surface of the circular arc shape is toothless over a constant angle, a central portion in the circumferential direction is also toothless over a constant angle, and teeth engaged with the teeth of the partially toothless gear 70a are provided in other portions. Only when the teeth of the partially toothless gear 70a and the teeth of the partially toothless gear 70b are engaged with one another, the rotational force of the partially toothless gear 70a is transmitted to the partially toothless gear 70b. In addition, the diameter of the partially toothless gear 70b, for example, is larger than that of the partially toothless gear 70a.

Next, the operation of the present embodiment will be described referring to FIGS. 11 and 5. FIG. 11 is a diagram for explaining an operation of the operating device for the switch according to the present embodiment. In particular, FIG. 11(a) is a diagram of the operating device when the disconnector is in an ON state; FIG. 11(b) is a diagram of the operating device when the disconnector is in a fully open state; and FIG. 11(c) is a diagram of the operating device when the disconnector is in a grounded state.

First, for example, the operation in the case of switching the disconnector 2 from the fully open state (FIG. 5(b)) to the disconnector ON state (FIG. 5(a)) will be described. In the state of FIG. 11(b), when the pulley 14 rotates counterclockwise, the pulley 4 also rotates counterclockwise via the wire 20 and the partially toothless gear 70a is also driven with the rotation. The partially toothless gear 70a idles until its teeth and the teeth of the partially toothless gear 70b are engaged with each other, thereafter, the mutual teeth are engaged with one another, and the rotation of the pulley 4 is transmitted to the partially toothless gear 70b serving as a driven wheel via the partially toothless gear 70a. That is, the partially toothless gear 70a rotates the partially toothless gear 70b clockwise to reach the state of FIG. 11(a). In the state of FIG. 11(a), the partially toothless gear 70a idles again, the partially toothless gear 70b stops, and the movable contactor 60 stops in a state of being in contact with the fixed contactor 61 (FIG. 5(a)).

Next, for example, the operation in the case of switching the disconnector 2 from the fully open state (FIG. 5(b)) to the grounded state (FIG. 5(c)) will be described. When the pulley 14 rotates clockwise in the state of FIG. 11(b), the pulley 4 also rotates clockwise via the wire 20 and the partially toothless gear 70a is also driven with the rotation. The partially toothless gear 70a idles until its teeth and the teeth of the partially toothless gear 70b are engaged with each other, thereafter, the mutual teeth are engaged with each other, and the rotation of the pulley 4 is transmitted to the partially toothless gear 70b serving as a driven wheel via the partially toothless gear 70a. That is, the partially toothless gear 70a rotates the partially toothless gear 70b counterclockwise to reach the state of FIG. 11(c). In the state of FIG. 11(c), the partially toothless gear 70a idles again, the partially toothless gear 70b stops, and the movable contactor 60 stops in a state of being in contact with the fixed contactor 62 (FIG. 5(c)).

According to the present embodiment, the operating device for the switch can be achieved by the Geneva mechanism 3 that is different from that of the first embodiment.

Further, it is satisfactory if the configuration of the Geneva mechanism 3 includes the pulley 4 that rotates while the pulley 14 rotates and a driven wheel that is intermittently driven while the pulley 4 rotates to drive the movable contactor, and the configuration of the Geneva mechanism 3 is not limited to the configuration examples of the first and second embodiments.

INDUSTRIAL APPLICABILITY

As described above, the present invention is useful as an operating device for a switch such as a disconnector that constitutes a gas insulated switching apparatus.

REFERENCE SIGNS LIST 1, 1a to 1c, 87 to 89 operating device, 2, 2a to 2c, 84 to 86 disconnector, 3, 3a to 3c Geneva mechanism, 4, 14 pulley, 5 driven wheel, 6, 13 rotary shaft, 7 pin, 8 groove, 10, 10a to 10c drive unit, 11 motor, 12 power source, 20, 20a to 20c wire, 30 to 32, 130 to 132 line unit, 33, 83 breaker, 34, 35, 90, 91 bus-bar, 36 frame, 50, 150 gas insulated switching apparatus, 50a, 50b fixing point, 60 movable contactor, 61, 62 fixed contactor, 65 box, 70a, 70b partially toothless gear

The invention claimed is:

1. A gas insulated switching apparatus that includes a switch that is a disconnector, a grounding switch, or a disconnector including a grounding switch in an integrated fashion, and an operating device for the switch, wherein
the operating device comprises:
a drive unit that includes a forwardly and reversely rotatable motor serving as a drive source for driving a movable contactor of the switch, a power source that supplies electric power to the motor, and a first pulley that rotates with rotation of the motor;
a Geneva mechanism that includes a second pulley that rotates with rotation of the first pulley, and a driven wheel that is intermittently driven while the second pulley rotates to drive the movable contactor, the Geneva mechanism being attached to the switch disconnected from the drive unit; and
a flexible rotational force transmission member that is stretched between the first pulley and the second pulley to transmit a rotational force of the motor from the first pulley to the second pulley, wherein
the second pulley includes a projection on one end surface in an axial direction,
the driven wheel has a groove with which the projection is engaged, and
the groove is V-shaped.

2. The gas insulated switching apparatus according to claim 1, wherein the rotational force transmission member is a wire.

3. The gas insulated switching apparatus according to claim 1, wherein
the gas insulated switching apparatus includes
a plurality of the switches, and
a plurality of the operating devices, number of which is same as the switches, and
the drive units of the operating devices are housed in a same box.

4. The gas insulated switching apparatus according to claim 1, wherein a movement path of the rotational force transmission member between the drive unit and the Geneva mechanism is bent.

5. A switch that includes a main body of the switch that is a disconnector, a grounding switch, or a disconnector including a grounding switch in an integrated fashion, and an operating device for the switch, wherein
the operating device comprises:
a drive unit that includes a forwardly and reversely rotatable motor serving as a drive source for driving a movable contactor of the switch, a power source that supplies electric power to the motor, and a first pulley that rotates with rotation of the motor;
a Geneva mechanism that includes a second pulley that rotates with rotation of the first pulley, and a driven wheel that is intermittently driven while the second pulley rotates to drive the movable contactor, the Geneva mechanism being attached to the switch disconnected from the drive unit; and
a flexible rotational force transmission member that is stretched between the first pulley and the second pulley to transmit a rotational force of the motor from the first pulley to the second pulley, wherein
the second pulley includes a projection on one end surface in an axial direction,
the driven wheel has a groove with which the projection is engaged, and
the groove is V-shaped.

* * * * *